United States Patent
Casamatta

(10) Patent No.: US 6,173,383 B1
(45) Date of Patent: Jan. 9, 2001

(54) INTERFACE BRIDGE BETWEEN A SYSTEM BUS AND LOCAL BUSES WITH TRANSLATION OF LOCAL ADDRESSES FOR SYSTEM SPACE ACCESS PROGRAMMABLE BY ADDRESS SPACE

(75) Inventor: Angelo Casamatta, Milan (IT)

(73) Assignee: Bull HN Information Systems Italia S.P.A., Milan (IT)

( * ) Notice: Under 35 U.S.C. 154(b), the term of this patent shall be extended for 0 days.

(21) Appl. No.: 09/102,845

(22) Filed: Jun. 23, 1998

(30) Foreign Application Priority Data

Jun. 27, 1997 (EP) .................................................. 97830308

(51) Int. Cl.⁷ .............................. G06F 13/00; G06F 15/00
(52) U.S. Cl. ........................................... 711/202; 710/127
(58) Field of Search ................................... 710/127, 128; 711/202, 210

(56) References Cited

U.S. PATENT DOCUMENTS

| | | | |
|---|---|---|---|
| 4,638,426 | * 1/1987 | Chang et al. | 711/216 |
| 4,888,688 | * 12/1989 | Hartvigsen et al. | |
| 5,309,568 | 5/1994 | Ghosh et al. | 395/325 |
| 5,561,814 | * 10/1996 | Glew et al. | 710/13 |
| 5,619,671 | * 4/1997 | Bryant et al. | 711/202 |
| 5,644,755 | * 7/1997 | Wooten | 395/500 |
| 5,668,949 | * 9/1997 | Nardone et al. | 709/201 |
| 5,682,512 | * 10/1997 | Tetrick | 711/202 |
| 5,835,738 | * 11/1998 | Blackledge, Jr. et al. | 710/127 |
| 5,838,932 | * 11/1998 | Alzien | 710/128 |
| 5,878,238 | * 3/1999 | Gan et al. | 710/128 |
| 5,890,011 | * 3/1999 | Abbondanzio et al. | 710/9 |
| 5,895,480 | * 4/1999 | Yung et al. | 711/5 |
| 5,895,503 | * 4/1999 | Belgard | 711/202 |
| 5,898,888 | * 4/1999 | Guthrie et al. | 710/128 |
| 5,930,833 | * 7/1999 | Yoshioka et al. | 711/210 |
| 5,949,436 | * 9/1999 | Horan et al. | 345/501 |
| 5,954,812 | * 9/1999 | Shiell et al. | 712/39 |

FOREIGN PATENT DOCUMENTS

| | | |
|---|---|---|
| 0297931 A2 | 1/1989 | (EP) . |
| WO95/22106 | 8/1995 | (WO) . |

OTHER PUBLICATIONS

Database WIP, Section EI, Week 9123, Derwent Publications LTD., London, GB, Class T01, AN91–169417, XP002048589, Anonymous: "Processor to MMIO Bus Dirgible Mapping Control—Allowing Address Range and Starting Address of Mapped Area to be Specified Allowing Multiple Buses to be Mapped Onto a Single Bus", *Abstract*.

* cited by examiner

*Primary Examiner*—Paul R. Myers
(74) *Attorney, Agent, or Firm*—Sheridan Ross P.C.

(57) ABSTRACT

Interface bridge (13) between a system bus (ASBUS) and at least one local bus (11, 12), the system space directly addressable through said system bus being greater than the system space directly addressable through the local bus, comprising a plurality of programmable decoders (17, 18, 19) each of which defines a distinct range within the range directly addressable through the local bus, and a range attribute as range of local bus addresses to be translated or to be transferred directly to the system bus and also identifies a local bus address as being included or otherwise within the range, so that depending on whether the local bus address belongs to one of the ranges or not and on the range attribute, the local bus address is transferred to the system bus as a direct address or as an address translated by a translation logic (20, 21) and capable of addressing the entire system space.

10 Claims, 3 Drawing Sheets

INTERFACE BRIDGE BETWEEN A SYSTEM BUS AND LOCAL BUSES WITH TRANSLATION OF LOCAL ADDRESSES FOR SYSTEM SPACE ACCESS PROGRAMMABLE BY ADDRESS SPACE

TECHNICAL FIELD

The present invention concerns an interface bridge for the interconnection of a system bus with one or preferably more local buses providing interconnection of I/O devices with the PCI (Peripheral Component Interconnect) type interface.

BACKGROUND OF THE INVENTION

It is known that symmetrical multiprocessor (interconnected by a system bus) architectures are used in modern data processing systems to achieve ever higher performance levels, where the accessible or system memory space has increased enormously.

For example, the modern POWER PC 604/620 type microprocessors, using 48-bit addresses, enable addressing of a system space of $2^{48}$ bytes.

The space is termed system space because it comprises both a memory space and also spaces for I/O peripherals and for registers.

It is also known that the number of processors, memories and I/O devices that can be connected to a system bus is limited, and that tree structures have been developed in order to overcome these limits.

Only a few, fast units, essentially microprocessors, are connected directly to the system bus, while I/O devices are connected to local buses and the latter to the system bus by way of logic units that act as a collector and interface bridge, appropriately called PCI bridges.

PCI bridges have a variety of functions. They arbitrate access to the local bus by units connected thereto, they distinguish which of the requesting local units require access to the system bus, latch their requests in suitable buffers, and take their place in access to the system bus. As the local buses and system bus may, and in general do, have different timing and different communication protocols, the PCI bridges interact with the two types of bus in compliance with the timing and respective protocols of each.

A problem that these bridges have to solve is that of permitting the local units to access the entire system space through the system bus.

The problem arises because local buses implement communication protocols wherein addresses of only 32 bits are used, conveyed on an address bus having only 32 wires.

Hence the space that is addressable by local units through the local bus is of only 4 GB.

When it is recalled that local units are assigned a peripheral space visible to processors through the system bus, within the same range of addresses it will be obvious that the outer space visible to the peripheral units is less than 4 GB.

The state of the art solutions to this problem are entirely unsatisfactory.

In a first solution, arrangements have been made for the software to execute move operations.

To write data into a memory space that is not directly accessible, a local unit can first transfer the data to a DMA (Direct Memory Access) buffer, located in a directly accessible memory space (i.e. in a system memory space addressable with only 32 bits), and then transfer the data to a space beyond the 4 GB with a software move command, performed by a logic for controlling direct access to memory that is necessarily interfaced with the system bus.

Similarly for reading, the data must first be transferred with a move operation, from a not directly accessible memory space, into the DMA buffer, located in an accessible space, where they can be read.

It will be obvious that this solution is not very effective and restricts performance. It is generally unacceptable for very frequently used local units, such as disk units and the like.

In a second solution, the 32-bit address is translated into an address with more bits, for example by concatenation of the 32 bits with an address range contained in a register of the bridge.

This is obviously an inflexible solution because it obliges the various local units connected to the local bus to use the same 4 GB range of system space, even though the contents of the register may periodically be changed.

Furthermore, unless a signal consisting of one of the 32 address bits can be provided in each addressing operation to qualify the address as a direct access address or as an address to be concatenated, this second solution is incompatible with the first.

Greater addressing flexibility has been recently obtained by the definition of a standard reference architecture called CHRP (Common Hardware Reference Platform) which enables the interconnection through local buses and a system bus of units supplied by different manufacturers working to this standard.

The CHRP architecture proposes a third solution and defines a mechanism for translating direct memory access addresses in the 32-bit address space of a local bus such as the PCI bus into the 64-bit addresses of a system bus.

For each bridge of the system (there may be several bridges in the system and, more specifically, dual or twin-bridge PCI bridge units are available for interconnecting a system bus and two local buses) provision is made of a table allocated in memory and called TCE (Translation Control Entry).

The bridge unit comprises a register TCE ADDR REG (one for each bridge with a local bus), the contents of which determine the memory allocation base or starting address and the size of the TCE table.

Each entry in the TCE table describes a page of memory (4 KB) in the 32-bit address space, associating a translated address with the page for addressing through the system bus a system space defined by 64-bit addresses.

Accordingly, through the contents of the TCE ADDR REG register and the 20 most significant bits of a 32-bit address received from the local bus (the 12 least significant bits constitute a page OFFSET), the bridge unit can point to a TCE table entry, read the address identifying the entry requested in the system space and access the entry with this address.

Clearly, in order to avoid having to perform two system space access operations each time, the first to read the TCE entry and the second to access the entry desired, the bridge unit is preferably provided with an address cache that directly associates the corresponding 64-bit address to be used in accessing the system bus with the local bus 32-bit address.

The CHRP architecture specification requires that the bridges be provided with a programmable bit (and associated supporting bistable cell), called the global bit, that enables/disables the address translating mechanism based on the TCE table for the whole local bus.

Accordingly, the system space can be accessed from a local bus with or without translation, with system space visibility being restricted in the latter case to the first 4 GBs only.

Therefore, this third solution, though at least partly overcoming the limitations of the first two, is still unsatisfactory because all the local units connected to a local bus must use, or not use, the mechanism.

The system is therefore still inflexible.

SUMMARY OF THE INVENTION

It is an object of the present invention to overcome these drawbacks of the prior art.

The present invention offers an interface bridge, preferably dual type (with two bridges interfacing with two local buses) wherein the address translation mechanism via TCE table is selectively enabled/disabled depending on whether or not the local bus addresses belong to one or other of a plurality of address ranges, preferably three, the width of the ranges being programmable.

This enables the system to use jointly and dynamically, i.e. for each address placed successively on the local bus, either of the two solutions (system bus addressing with address translation or direct addressing, without translation).

In this way, local units that for whatever reason (compatibility, for example) cannot support the TCE table translation mechanism, or for which the system bus access frequency is so low as not to justify use of this mechanism, may employ the first solution (transfer to a DMA buffer and subsequent move operation) whereas other local units requiring high performance levels may use the third solution (address translation based on a TCE table).

Though two separate ranges are sufficient for defining the addressing mode, three separate ranges are preferable in the case of a dual interface bridge (for interfacing with two local buses) to permit peer-to-peer data transfers between the two local buses without the need for address translation.

These results are achieved by an interface and communication bridge, hereinafter PCI bridge, provided with two address decoders for recognizing whether an address, present on the local bus to which the PCI bridge is connected, belongs to one or the other of two address ranges or to neither thereof.

The PCI bridge is preferably dual type, with two ports for connection to two local buses, and comprises for each local bus connection port, at least two, and preferably three, address decoders.

Each of the address decoders comprises four programmable registers for respectively storing a base, a limit, a relocation address and attributes, and hence named as follows:

Memory base register;
Memory limit register;
Memory relocation register; and
Memory attribute register.

The memory attribute register and the contents thereof define the memory access attributes and, in particular among the attributes, whether the TCE table is enabled and addresses have to be translated by the said table.

Accordingly, depending on whether an address belongs to one or the other of the address ranges defined by the decoders, for which the attribute bit enabling the TCE table may be differently and selectively pre-set, the address on a local bus may be transferred to the system bus without any change, with the sole change of having a value defined by the contents of the Relocation Register added to the local bus address, or with a translation performed using the TCE table.

Great addressing flexibility is thus obtained, entirely overcoming the limits of the state of the art.

A further advantage is that peer-to-peer data transfers are permitted between one local bus and another local bus, without intervention of the TCE table.

BRIEF DESCRIPTION OF THE DRAWINGS

Characteristics and advantages of the present invention will become clearer in the description that follows of a preferred embodiment, provided with reference to the accompanying drawings, where.

DETAILED DESCRIPTION OF THE PREFERRED EMBODIMENT

Figure 1:
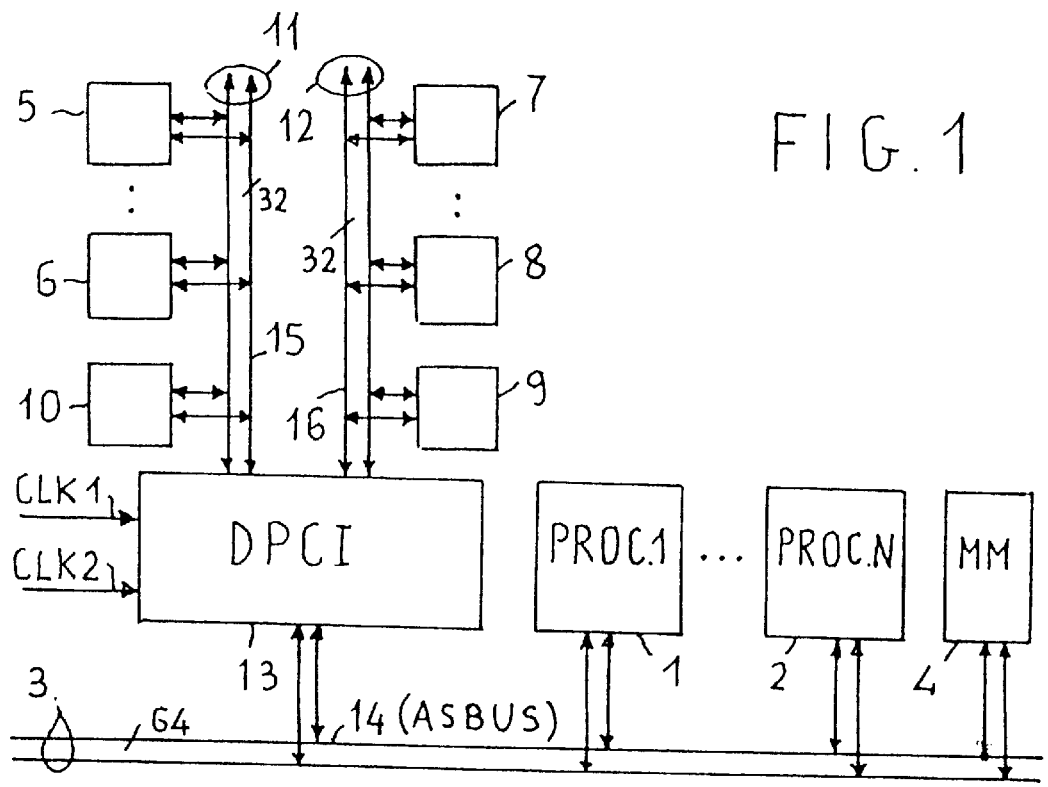
FIG. 1 is a block diagram of a data processing system architecture with system bus and local buses.

For a better understanding of the invention, FIG. 1 shows a block diagram representing a system architecture with a plurality of processors 1, 2 interconnected in a direct coupling link by a system bus 3, comprising an ASBUS address channel 14 with 64 wires, of which in practice only 48 are currently employed for defining an address. The other wires are used for transferring control information (parity checking or EDAC error correction, address identification tags, etc.).

With 48 wires, it is thus possible to identify a data unit, generally the byte, in a system space of $2^{48}$ bytes.

The processors 1,2 may each be provided with a local memory, as well as with a cache, and may also access, through the system bus, a shared working or main memory 4, generally laid out in blocks operating in interleaving mode for improved efficiency.

To reduce the number of loads connected to the system bus and improve performance, the majority of peripheral units, such as printers, mass memories, communication terminals, etc., 4, 5, 6, 7, 8, 9, 10, commonly called I/O devices, are not connected directly to the system bus 3, but instead to one or more local buses, 10, 12, two in FIG. 1.

Connection to the system bus 3 is made through an interface bridge device DPCI 13 which is connected on one side to the system bus 3 and on the other side to the local buses 11, 12.

As the interface bridge is connected to the two local buses it is called Dual PCI bridge.

Local buses generally have different communication protocols and timing from those of the system bus.

It is the role of the DPCI 13 to manage and arbitrate accesses by the various peripheral units directly connected to the local buses, operating as a local bus buffer and arbiter unit, and also to manage access to the local buses by the processors connected to the system bus.

If the peripherals connected to the local buses have to obtain access to the system bus, for example to transfer data to the processors 1,2 or to the main memory 4 (by means of a DMA or direct memory access operation), the DPCI 13 must request system bus access, conforming to the communication protocol and timing of the system bus.

All the above are conventional aspects and do not require any further explanation.

The local buses 11, 12 comprise an address channel 15, 16 respectively consisting of 32 wires only, for the transfer of addresses consisting of 32 bits only.

The addressable space is therefore less than that visible by the system bus, being limited to only $2^{32}$=4 GB.

Whereas addressing the various units connected to the local buses through the system bus is not a problem (for this purpose, the most significant bits of a 48-bit address define in a known way a system space range, obviously not greater than 4 GB, assigned to the units connected to the local bus, which may be recognized by a decoder of the DPCI 13 for addressing the various peripherals connected to the local bus with only the 32 least significant bits of the address, one of which peripherals may in turn be recognized as the destination), the inverse addressing flow involves the problems discussed in the foregoing.

Figure 2:
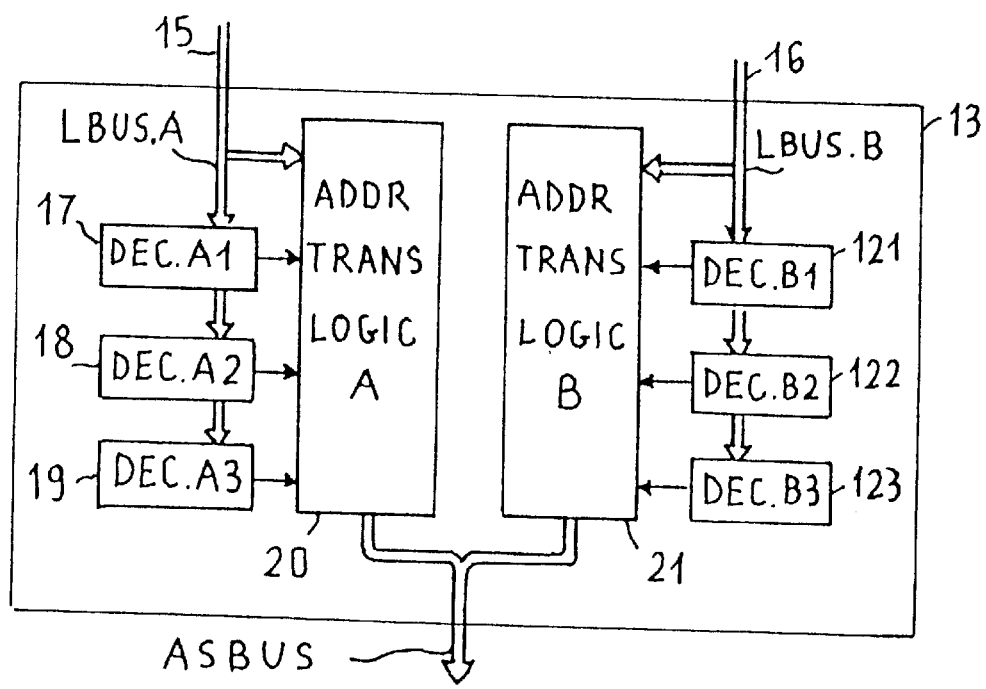
FIG. 2 is a block diagram of an assembly comprising a dual interface bridge between a system bus and local buses, built in accordance with the present invention.

To solve these problems the DPCI is provided, as illustrated in FIG. 2, with three decoders for each local bus and an address translation logic for each local bus.

In particular, the address channel 15 of the local bus 11, identified as LBUS.A in FIG. 2, is connected to three decoders 17, 18, 19 (DEC.A1, DEC.A2, DEC.A3) and to an address translation logic 20 (ADDR TRANS LOGIC.A).

Similarly the address channel 16 of the local bus 12, identified as LBUS.B in FIG. 2, is connected to three decoders 121, 122, 123 (DEC.B1, DEC.B2, DEC.B3) and to an address translation logic 21 (ADDR TRANS LOGIC.B).

The address translation logics 20, 21 output on the system bus ASBUS an address, translated or not translated depending on whether the address received from the local bus belongs to one of the address ranges defined by the decoders.

Figure 3:
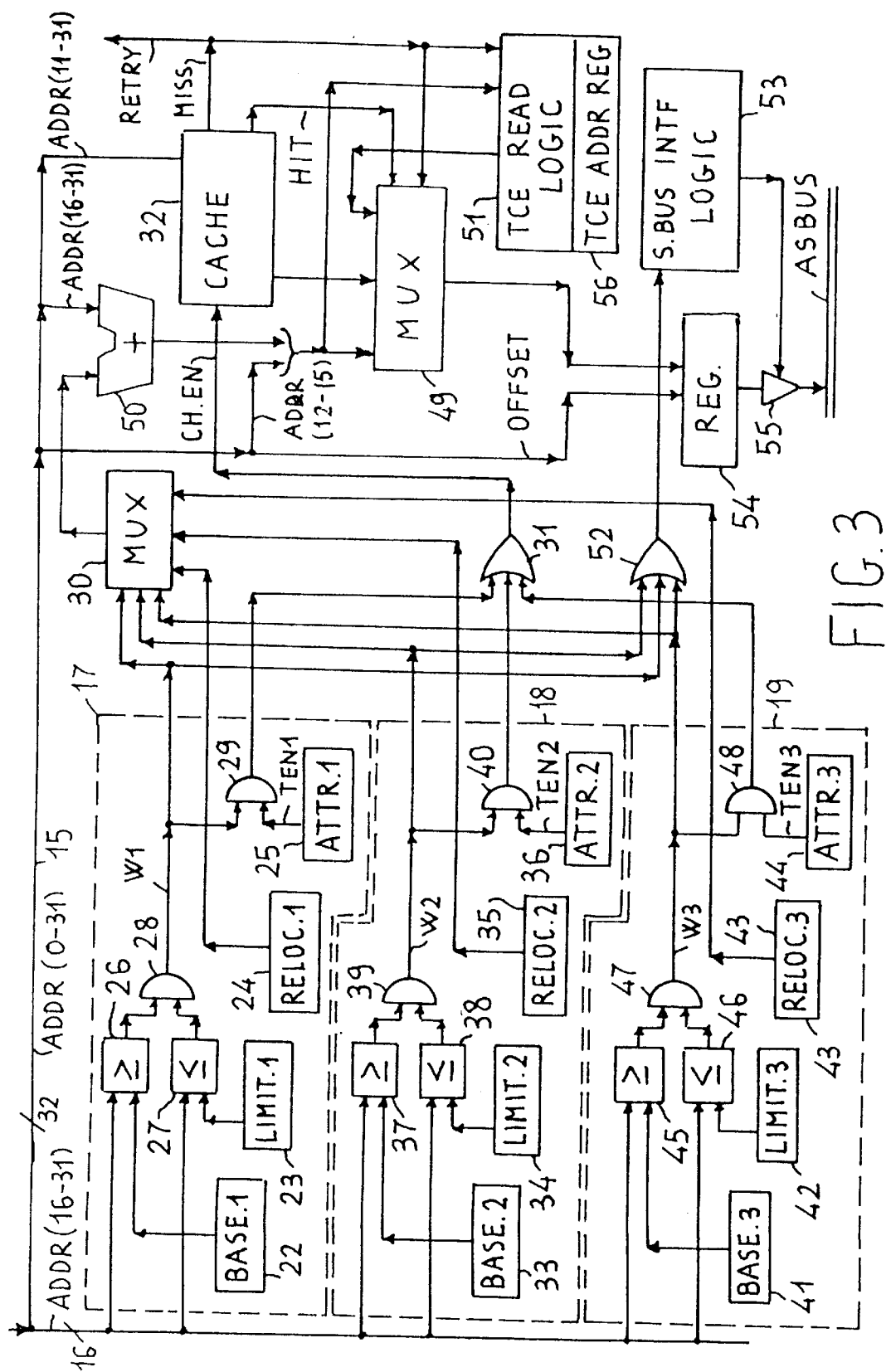
FIG. 3 is a block diagram in greater detail of a preferred embodiment of the dual bridge of FIG. 3.

FIG. 3 shows in block diagram form in greater detail a preferred embodiment of the three decoders 17, 18, 19 and of the address translation logic 20 of FIG. 2.

The decoder 17 comprises four programmable registers 22, 23, 24, 25 for storing respectively an address range base BASE.1, an address range upper limit LIMIT.1, a relocation quantity RELOC.1 and suitable range attributes ATTR.1.

Of these attributes, only one is of interest for the purposes of the present invention, namely that defined by a bit TEN1 which, according to whether it is in the asserted or deasserted status, indicates whether the addresses in the range defined by the base and upper limit have to be translated using the table TCE or not.

The registers 22, 23, 24 preferably have a capacity of 16 bits, corresponding to the higher order bits of a 32-bit address. In this way, they define an address range and relocation quantity with a resolution equivalent to 64 KB.

However there is nothing to prevent registers with greater or lesser capacity from being used.

The decoder 17 also comprises two comparators 26, 27 and two AND logic gates 28, 29.

The comparators 26, 27 receive as input the 16 higher order bits ADDR(16–31) of the 32-bit address present on the local bus 15 (LBUS.A) and compare them with the contents respectively of the registers 22 and 23 to determine if the address is greater than or equal to BASE.1 or less than or equal to LIMIT.1.

If it is found to be so, the two comparators each assert an output signal.

The two signals are input to the AND gate 28, which outputs a signal W1 to indicate that the address received is within the range defined by registers 22, 23.

The signal W1 controls a multiplexer 30 of the address translation logic to transfer to the output the relocation value RELOC.1 stored in the register 24.

Additionally, WI is AND-ed in the AND gate 29 with the bit TEN1 output by register 25 (ATTR.1) and enables, through an OR gate 31 of the address translation logic, the intervention of an address cache 32, again part of the address translation logic.

Perfectly similar from the circuitry and operating viewpoints is the structure of the decoder 18, which comprises a base register 33 for storing a BASE.2, a register 34 for storing a LIMIT.2, a register 36 for storing attributes ATTR.2, two comparators 37, 38 and two AND gates 39, 40.

By the same token, the decoder 19 comprises the registers 41, 42, 43, 44 for storing respectively a BASE.3, a LIMIT.3, a RELOC.3 and attributes ATTR.3, two comparators 45, 46 and two AND gates 47, 48.

The address translation logic may now be considered as a whole. It comprises the multiplexer 30, the OR gate 31, and the cache memory 32 already discussed, a second multiplexer 49, an adding network 50, a logic 51 for reading the TCE table in the system memory (TCE READ LOGIC), an OR gate 52, an interface logic 53 (for system bus access), a buffer register 54 for addresses output towards the system bus, and tristate drivers 55 for connection to the system bus ASBUS.

The multiplexer 30 receives on the selection inputs the signals W1, W2, W3 output respectively by the AND gates 28, 39, 47 for selectively transferring to the output the relocation value RELOC.1, RELOC.2, RELOC.3 received on the inputs.

The output of the multiplexer 30 is connected to an input of the adding circuit 50 which, on a second input, receives the 16 most significant bits ADDR(16–31) of the local bus address and sums them with the relocation value output by the multiplexer 30.

Any carryover value is ignored.

The relocated address on the output of the adding circuit 50, concatenated with the intermediate order bits ADDR (12–15) of the local address, constitutes a page address taken to a first input of the multiplexer 49 and to an input of the TCE table read logic 51.

The multiplexer 49 also receives, on a second input, a translated page address, output by the cache 32 and, on a third input, an address generated by the logic 51.

The multiplexer 49, for selection purposes, is controlled by two signals HIT and MISS generated by the cache 32 when the latter is enabled by a signal CHEN, raised on the output of the OR gate 31.

When HIT and MISS are both lowered (cache 32 inactive) the multiplexer 49 transfers the page address from its first input to the output.

The page address, concatenated with a page OFFSET constituted by the 12 least significant bits of the address on the local bus, is brought to the input of the register 54 and loaded therein on command of the logic 53 (SBUS INTF LOGIC), for transfer to the system bus ASBUS, in compliance with the timing and communication protocol of the said bus.

The logic 53 is activated by a signal asserted on the output by the OR gate 52, which receives as input the signals W1, W2, W3.

In other words, each time a local bus address is inside one of the ranges defined by the decoders 17, 18, 19, this address, translated or otherwise, must be transferred to the system bus.

When this is not the case, the local bus address is an address identifying the space of a peripheral unit connected to the same local bus for performing data transfer (read or write) between units connected to the same local bus, without the need for conversion or system bus access.

When the local bus address is inside one of the ranges, as indicated by the assertion of one and only one of the signals W1, W2, W3 (the ranges defined by the decoders 17, 18, 19 must not be overlapping), the associated range attribute TEN1, TEN2, TEN3 defines whether or not the address has to be translated.

When it has to be translated (Wi asserted and TENi asserted), the OR gate 31 asserts on the output an enable signal CHEN for the cache 32.

The cache 31, preferably though not necessarily of the fully associative type, contains a certain number of entries in each of which a page address is loaded as received from the local bus and also the corresponding translated page address, laid out on more than 20 bits, for example 36.

The cache 32 receives as input the page address ADDR (11–31) present on the local bus.

If the signal CHEN is asserted, the cache 32 compares the page address on the local bus with all the page addresses stored therein and, if a match is found, asserts a signal HIT and outputs the corresponding translated page address, input to the second input of the multiplexer 49.

The signal HIT, when asserted, controls selection of the appropriate input of the multiplexer 49.

The translated page address output by the multiplexer 49, concatenated with the page OFFSET received directly from the local bus, is then loaded into the register 54 from where it is transferred to the system bus.

If no match is found, the cache 32 asserts a signal MISS which is sent as an activation signal to the logic 51 and as a retry signal (RETRY) to the local bus.

The TCE table read logic 51 comprises a register 56 TCE ADDR REG, wherein is stored the starting address in the memory space of the TCE table and preferably also a field defining the size (SIZE) of the table.

The known type read logic sums the starting address contained in the register 56 and the page address, consisting of the output of the summing circuit 50 concatenated with the bits ADDR (12–15) of the local address, and with this information (wherein the most significant bits are masked, where appropriate, depending on the size of the table), brought to the third input of the multiplexer 49 and from there transferred to the output (the multiplexer is controlled in selection by the signal MISS), loads the register 54, together with the associated address OFFSET, for performing reading of the entry in the TCE table containing the translated page address that has to be loaded into the cache and subsequently used for correctly addressing the memory space.

To sum up, the following are the possible cases for the translation of addresses on the local bus:

1) The address on the local bus is not inside any of the ranges defined by the decoders 17, 18, 19.

This means that the address is that of a unit connected to the same local bus, which can be accessed directly without involving the system bus.

2) The address on the local bus is inside one of the ranges defined by the decoders 17, 18, 19, for example inside the range of decoder 17, and the associated attribute TEN1 defining intervention of the conversion table is negated.

In this case, no address translation is performed and the address summed with a relocation value, provided the latter is other than zero, is transferred to the system bus and identifies an entry in the system space which is still inside the range of the first 4 GB of the addressable space.

3) The address on the local bus is inside one of the ranges defined by the decoders 17, 18, 19, for s example inside the range of decoder 18, and the associated attribute TEN2 defining intervention of the conversion table is asserted.

In this case, with address translation being required, the cache 32 providing the translated page address is activated.

This may identify an entry in the much wider system space, in particular of $2^{48}$ bits, or the number of actual address bits provided in a 64-bit address.

As a sub-case, in the event of a cache MISS, a procedure is activated in a known way to call up the translated address from the TCE table and have the cache contents updated therewith, in a replacement operation; the system space access is carried out subsequently, using the translated address now available in the cache.

It is readily apparent that the system described is extremely flexible.

Size of the ranges defined by the decoders 17, 18, 19 may be programmed according to requirements, within the limits of a maximum cumulative width of 4 GB, with a resolution of 64 KB, and with the sole proviso that the ranges are not overlapping.

Further, the attribute TEN may be set for each range so that address translation occurs, or does not occur, for addresses inside the associated range.

Accordingly, it is possible for direct system space addressing without translation to coexist with indirect system space addressing with translation, as it is also possible to impose, according to system requirements, direct addressing or indirect addressing for all the local bus addresses that are inside the different ranges.

It will be obvious that all that is needed to permit coexistence of direct addressing with indirect addressing is to define two separate ranges in the addressable space of 4 GB and that, for this purpose, only two decoders are needed.

This is the optimum solution in the case of a system with a single PCI bridge for interconnecting one local bus and one system bus.

However, the use of three (or more) decoders is preferable as it combines with the advantages already seen that of permitting direct, peer-to-peer transfers between peripheral units connected to two different local buses interfaced with a system bus through two different PCI bridges or through a DPCI bridge.

This advantage is now described with reference to FIG. 4, which presents an example illustrating how a first bridge PCI.A and a second bridge PCI.B (for example, the two sections of a dual DPCI bridge) may be programmed so that peripheral units directly accessing the system space can co-exist with peripheral units using the TCE table for indirect system space addressing and how also peer-to-peer data transfers are possible between peripheral units connected to two different local buses.

Figure 4:
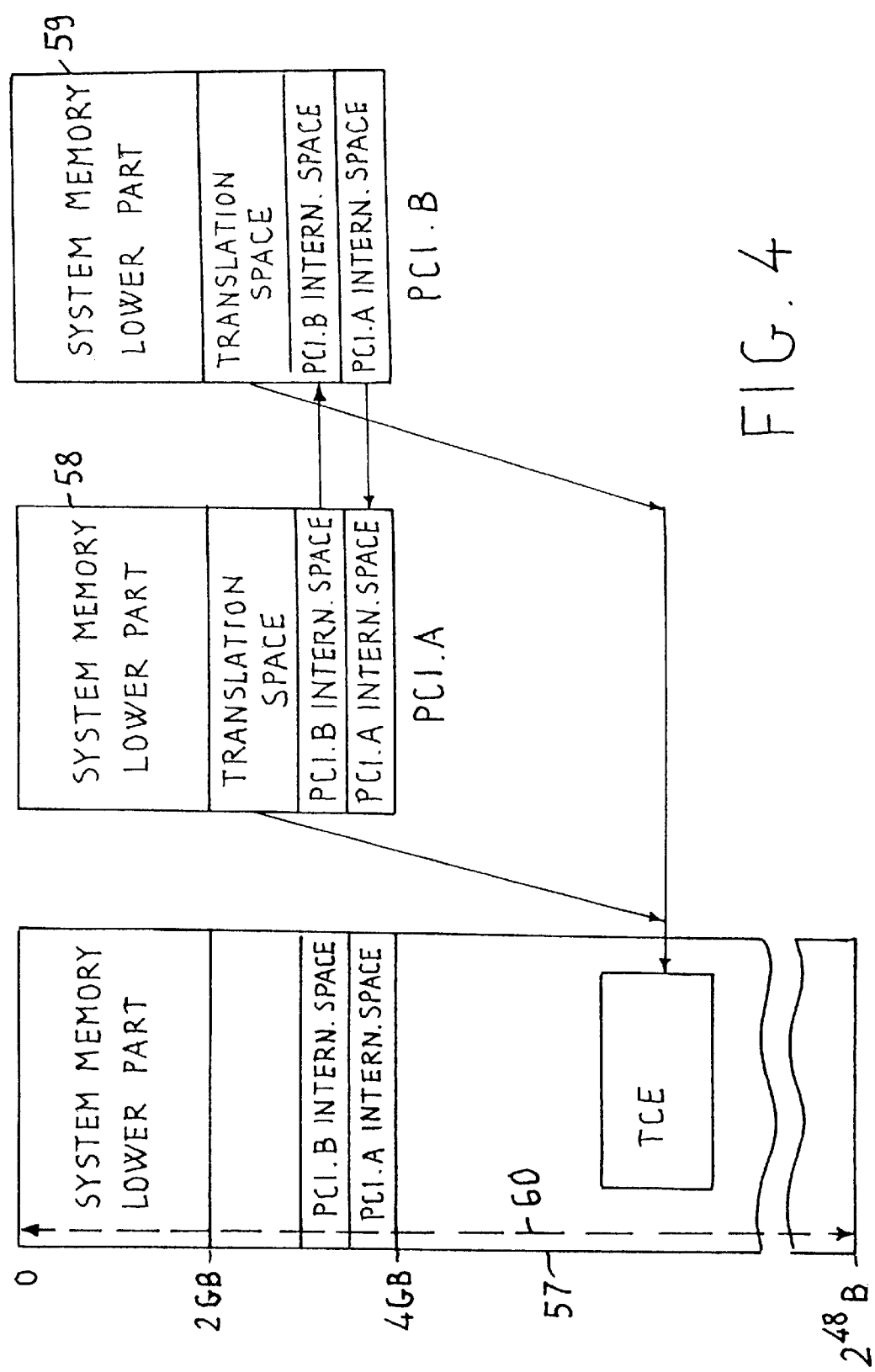
FIG. 4 shows the system space addressable by means of the dual bridge of FIGS. 2 and 3.

FIG. 4 is essentially a memory map as visible and addressable through the system bus and through the local buses.

The block 57 as a whole represents the entire memory or system space addressable with 48-bit addresses.

The blocks 58 and 59 represent respectively the memory space directly addressable with 32-bit local bus addresses, necessarily restricted to 4 GB.

A first decoder of each of the PCI bridges may be programmed (operation wherein the decoder registers are loaded with appropriate values) to define an address range of between 0 and 2 GB, with which a relocation value 0 and the negated attribute TEN are associated.

In this case, local bus addresses that are inside the range are transferred to the system bus for directly addressing a system memory lower space, which may actually be a space of memory or of processors directly connected to the system bus or a space of other units connected to other local buses.

This memory space is known as the system memory lower part.

This space, obviously external to the two PCI bridges, is visible directly to the units connected to the two PCI bridges.

A second decoder of the two PCIs may be programmed to define a second address range of between, for example, 2 and 3 GB, with an asserted attribute TEN and contents of the relocation register such that the relocated address, when summed with the contents of the register TCE ADDR REG, is inside the system memory space wherein the TCE table is allocated; the base of the said table, which may be allocated in any range of the memory space, is defined by the contents of the register 56 (FIG. 3: TCE ADDR REG).

Using addresses inside this range, the units connected to the local buses can access the TCE table, wherever it is allocated, and obtain therefrom an address translation permitting indirect access to any range of the memory space (as indicated by the broken line 60).

This memory space, seen by the PCIs, is known as the translation space.

A third decoder of one of the two PCI bridges (for example, PCI.A) may be programmed to define a third address range of between, for example, 3 and 3.5 GB, with deasserted attribute TEN and relocation register contents equal to 0.

This address range coincides conveniently with an inner space of the other PCI bridge (PCI.B).

This space is known as the PCI.B internal space.

The remaining width of the 4 GB space not included in any of the ranges, namely the address range between 3.5 and 4 GB, constitutes an internal space of the PCI.A bridge. With addresses inside this range, the units connected to the local bus A can transfer data among each other without involving the system bus.

This range is known as the PCI.A internal space.

Conversely, the third decoder of the other of the two PCI bridges (PCI.B in this case) may be programmed to define a third address range, between 3.5 and 4 GB corresponding to the inner space of the other bridge PCI.A.

For this range too, the relocation value is set to 0 and the attribute TEN is lowered.

Accordingly the units connected to the local bus B through addresses between 3.5 and 4 GB may access the inner space of the other bridge PCI.A and the units connected to the local bus A for peer-to-peer transfers.

The remaining range of between 3 and 3.5 GB not inside any of the ranges constitutes the PCI.B inner space.

In the foregoing, only one preferred embodiment is described.

It is obvious, as already stated, that two decoders are sufficient for address translation that is programmable by address spaces. The presence of more than two decoders, not necessarily 3 but possibly even 4 where desired, is only necessary where additional features are required, such as for example the peer-to-peer transfer of data between units connected to different local buses and intercommunicating through bridges providing interconnection to a common system bus.

The structure described in FIG. 3, though preferred, is also provided purely by way of example.

For example, the read logic 51 which, in the embodiment described, is shown for greater clarity as a detached block, known per se, and which must necessarily comprise an adding network not illustrated in the figure, may be built and interconnected by means of multiplexers and buffer registers to the adding unit 50, for use in two steps, in the first whereof an address A is produced from the sum of the address bits ADDR(16–31) and a relocation value, and in the second whereof the address A is summed with the TCE table base address contained in the register 56.

What is claimed is:

1. Interface bridge between a system bus and at least one local bus subordinate to the system bus, comprising:

a plurality of programmable decoders, each of which defines a corresponding range within a range directly addressable by said local bus, each of the corresponding ranges not overlapping the corresponding range defined by each of the other decoders, an attribute of each of said corresponding ranges being a set of direct local bus addresses or addresses to be translated, for transfer thereof to said system bus, and whether or not a local bus address belongs to said corresponding range;

translating means, controlled by said plurality of decoders, for translating and transferring an address of said local bus to said system bus, as a translated address, if said local bus address is inside a corresponding range defined by at least one of said decoders with a range attribute of an address to be translated; and direct addressing means, controlled by said plurality of decoders, for storing said address of said local bus in a local memory space that is compatible with said local bus and for moving said address from said local memory space to system memory space that is compatible with said system bus, if said local bus address is not inside a corresponding range defined by at least one of said decoders with a range attribute of an address to be translated.

2. Interface bridge according to claim 1, wherein said decoders are two, one of which defines an address range with direct addresses attribute, the other of which defines an address range with addresses to be translated attribute.

3. Interface bridge according to claim 1, wherein said bridge interfaces with two local buses and said decoders for each of the local buses are three, two of which define an address range with direct addresses attribute, for access to a system lower space and to an internal space of the other local bus respectively, and a third of which defines a range with addresses to be translated attribute.

4. Interface bridge according to claim 1, wherein each of said decoders comprises a first base register, a second upper limit register, a third relocation register, a fourth attributes register and means for comparing a local bus address with the contents of said first and second registers.

5. Interface bridge according to claim 2, wherein each of said decoders comprises a first base register, a second upper limit register, a third relocation register, a fourth attributes register and means for comparing a local bus address with the contents of said first and second registers.

6. Interface bridge according to claim 3, wherein each of said decoders comprises a first base register, a second upper limit register, a third relocation register, a fourth attributes register and means for comparing a local bus address with the contents of said first and second registers.

7. Interface bridge according to claim 1, wherein said translating means comprise a cache memory for associating each local bus address with a corresponding translated address and a read logic activated by a MISS signal output by said cache memory for reading a translated address, stored in a translated addresses table.

8. Interface bridge according to claim 2, wherein said translating means comprise a cache memory for associating each local bus address with a corresponding translated address and a read logic activated by a MISS signal output by said cache memory for reading a translated address, stored in a translated addresses table.

9. Interface bridge according to claim 3, wherein said translating means comprise a cache memory for associating each local bus address with a corresponding translated address and a read logic activated by a MISS signal output by said cache memory for reading a translated address, stored in a translated addresses table.

10. Interface bridge according to claim 4, wherein said translating means comprise a cache memory for associating each local bus address with a corresponding translated address and a read logic activated by a MISS signal output by said cache memory for reading a translated address, stored in a translated addresses table.

* * * * *